United States Patent [19]

Stein

[11] 4,002,848
[45] Jan. 11, 1977

[54] TOLL FRAUD ELIMINATOR FOR TELEPHONE SYSTEMS

[75] Inventor: Richard P. Stein, Monrovia, Calif.

[73] Assignee: Reliable Electric Company, Franklin Park, Ill.

[22] Filed: Sept. 26, 1975

[21] Appl. No.: 617,188

Related U.S. Application Data

[63] Continuation-in-part of Ser. No. 523,566, Nov. 14, 1974, abandoned.

[52] U.S. Cl. .................. 179/18 DA; 179/84 VF
[51] Int. Cl.² ........................................ H04M 1/66
[58] Field of Search ...... 179/18 DA, 27 CB, 84 VF

[56] References Cited

UNITED STATES PATENTS

| | | | |
|---|---|---|---|
| 2,816,962 | 12/1957 | Stanley | 179/41 R |
| 2,883,474 | 4/1959 | Fritschi | 179/84 A |
| 3,319,011 | 5/1967 | Maurushat, Jr. | 179/84 VF |
| 3,681,536 | 8/1972 | Pask et al. | 179/18 DA |
| 3,831,175 | 8/1974 | Mazalas | 179/84 VF X |

OTHER PUBLICATIONS

"Beating the Blue–Box Bandits", Marce Eleccion, IEEE Spectrum, vol. 9, No. 8, August 1972, pp. 52–58.

Primary Examiner—Thomas W. Brown
Attorney, Agent, or Firm—Laff, Whitesel & Rockman

[57] ABSTRACT

A tone detector is connected or otherwise associated with an outgoing telephone trunk line adapted to be included in a toll path. One or more frequency or tone signals are sent over the trunk line for signaling and control during a toll call. If these tone signals appear at a point on the trunk line where the toll call remains under the control of d.c. signals, they must be fraudulent since there is no preceding equipment which is adapted to send valid tone signals. Therefore, a tone detector may be connected to that point in order to drop or otherwise block any calls during which the fraudulent tone signals appear. The toll fraud eliminator is particularly — but not exclusively — useful for preventing employment of a "blue box" during toll calls. The tone detector uses two multivibrators which operate at an upper and a lower threshold frequency respectively. The half cycles of a given polarity in the single frequency tone must recur fast enough to continuously reset the multivibrator running at the lower threshold frequency, but not fast enough to continuously reset the multivibrator running at the upper threshold frequency.

13 Claims, 6 Drawing Figures

TOLL FRAUD ELIMINATOR FOR TELEPHONE SYSTEMS

This is a continuation-in-part of my copending patent application Serial No. 523,566, filed November 14, 1974 now abandoned.

This invention relates to fraud detection in toll telephone switching systems and more particularly to detection of so-called "blue boxes" which send unauthorized and fraudulent tone signals.

A "blue box" is a fraudulent device which generates one or more tones having frequencies commonly used as control signals in telephone systems, and especially in toll systems. These tones may be introduced into the telephone systems in any suitable manner. For example, the "blue box' may generate audible tones which acoustically activate the ordinary telephone transmitter. Once the resulting electrical analog of the tones appears in the telephone system, it travels through the normal voice path, just as all voice signals travel through that path. This is exactly the same way that the non-fraudulent tone signals are transmitted through the system. Therefore, the telephone equipment receiving the tone signals is unable to detect any difference between tones originating at a "blue box" and at legitimate control centers. In this manner, a person may fraudulently command the system to perform an unauthorized service.

The most important single control function illegitimately performed by a "blue box" relates to the rerouting or diversion of toll calls in a manner which forces someone else to pay for or absorb the cost of the diverted telephone call.

Accordingly, an object of the invention is to provide means for detecting and defeating fraudulent tone signals and more particularly the so-called "blue box" telephone calls. Here an object is to release or bar originating calls if an apparently valid tone signal appears in an established voice path at a point which precedes the point where tone signals can validly appear.

Still another object of the invention is to insure proper toll ticketing whereby the correct telephone number is charged for a call. Here, an object is to prevent a fraudulent diversion of a call, with the toll ticket charge being assigned to an incorrect number. In addition, an object is to prevent a fraudulent concealment or falsification of records of telephone calls.

In keeping with an aspect of the invention, these and other objects are accomplished by providing a tone detector in or associated with an outgoing trunk line, at a point on the line where the toll call remains held under d.c. supervision signals. If such tone appears at this point in the system, it must be a fraudulent tone since there is no preceding equipment which is adapted to send such a tone. Therefore, the detector is adapted to drop or otherwise block the call during which the fraudulent tone appears.

The nature of an embodiment of the invention will become more apparent from a study of the attached drawings wherein.

Figure 1:
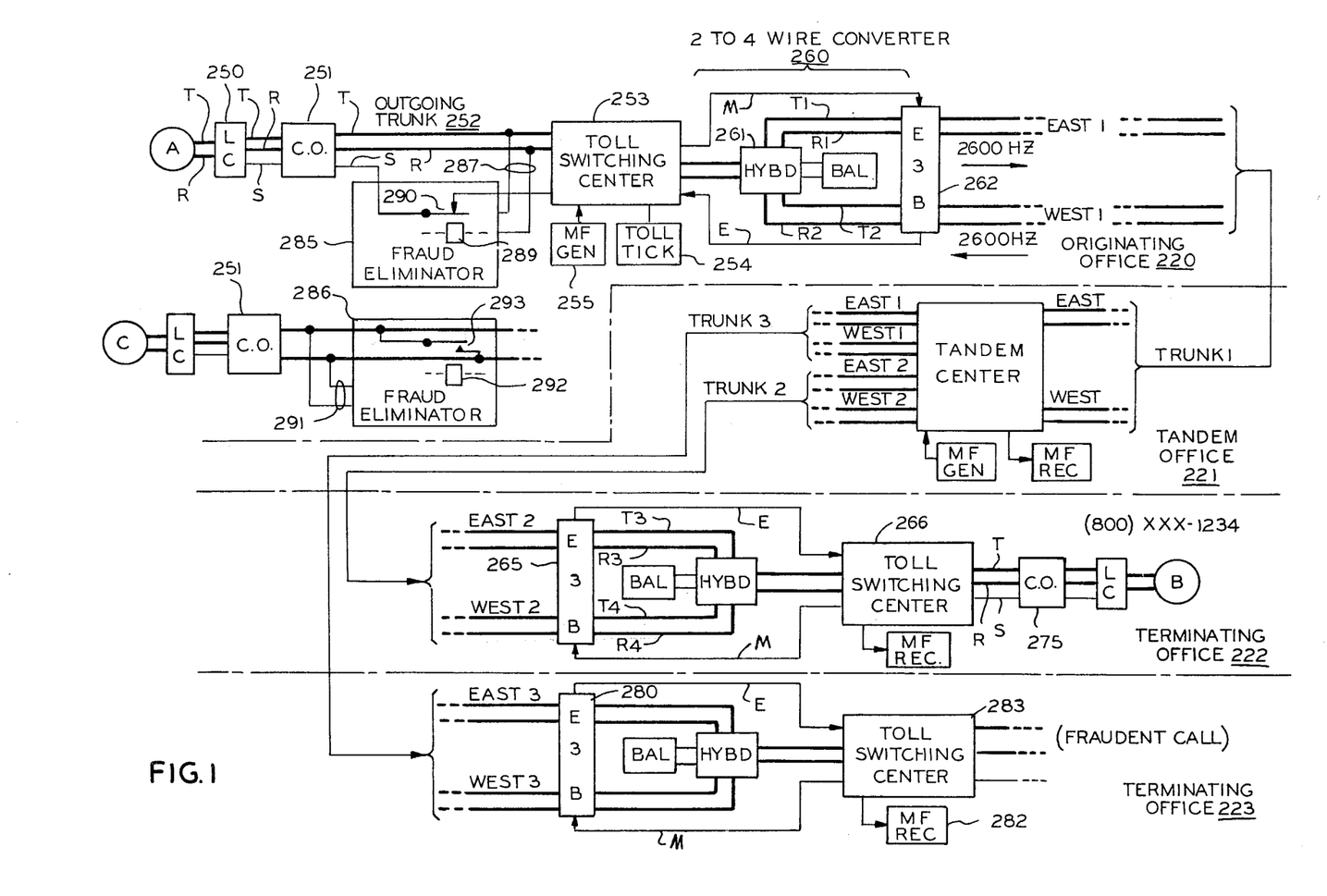
FIG. 1 is a block diagram of a toll trunking system incorporating the invention.

FIG. 1 shows a calling subscriber A, a called subscriber B, and four exemplary telephone offices 220-223 with suitable trunk lines extending between them. In greater detail, as here drawn, the first or local office 220 is the originating office where the call begins. The tandem office 221 is interposed between the originating office 220 and one or more terminating or distant offices 222, 223. This drawing was prepared to show that the originating call is directed to a toll free number (800-XXX-1234) in distant office 222. This is the originally dialed number that is stored in the toll ticketer to identify the subscriber who will be billed for the call.

The fraudulent call occurs when the calling subscriber at office 220 sends a fraudulent tone which drops the original connection via trunks 1, 2 to distant office 222 without releasing the call or canceling information stored in a toll ticketer. Thereafter, the calling subscriber A transmits multi-frequency tones, as new addressing digits, which divert the fraudulent call to a different called subscriber.

In greater detail, the calling subscriber A goes off-hook, closing a loop across tip and ring conductors T, R. Responsive thereto, the line circuit 250 responds to the closed loop by placing a demand upon its associated central office 251 switching equipment. Then, dial tone is returned from such switching equipment, and the calling subscriber A dials any suitable directory number in a normal manner. Here it is assumed that the calling subscriber dials the toll free number (800-XXX-1234) which means that called subscriber B, in distant office 222, will pay for the call.

Responsive to receipt of the directory number, the switching equipment in the central office 251 seizes an idle out-going trunk 252 leading to a toll switching center 253. The tip, ring, and sleeve T,R,S are now extended to the toll switching center 253. The sleeve lead S supplies a master ground which is used to hold switching equipment required to complete the call.

Any suitable register-sender (not shown) in the central office 251 transmits the addressing digits (800-XXX-1234) to the toll switching center 253. Along the way, a toll ticketer 254 is associated with the trunk 252 in any well known manner. The location of this toll ticketer 254 depends upon the practices of the telephone operating company which owns the local office 220. Here, it is assumed that the toll ticketer 254 is located in toll switching center 253. In any event, the toll ticketer 254 stores all ticketing information including the billing directory number (800-XXX-1234), time, date, and the like. This information is stored as it is generated; therefore, before the call leaves the office 220, the telephone number (800-XXX-1234) is stored in the ticketer.

Also, at some suitable place along the way, the d.c. signals used to control equipment in central office 251 are converted to tone signals of specific frequencies, for signaling throughout the toll switching network. This conversion from d.c. to tone signals is necessary since such tone signals are in the voice frequency band, and therefore may travel throughout the voice path, without requiring expensive d.c. signal repeaters.

Since voice frequency tone signals are used, anyone may reproduce them in any of many simple ways. For example, a person with a reasonably good sense of pitch may even sing a note of the desired frequency, blow a whistle, or the like, which is picked up by the telephone transmitter. However, even casual conversation also includes such frequencies. Therefore, this method of signaling usually involves equipment which tends to separate the control tone signals from ordinary voice signals. Accordingly, a person bent on fraud usually acquires an electronic signal generator (called a "blue box") which may duplicate the control tones which are legitimately generated in the system.

The tones may be either multi-frequency (or MF) tone signals which are used to control equipment within a telephone office or single frequency (or SF) tone signals which are used to communicate between the two ends of a trunk line. For an example of such a tone signaling, reference may be made to U.S. Pat. No. 2,642,500.

The toll center switching system 253 extends the call to a two-to-four wire converter 260 of any suitable design. As here shown, a conventional hybrid circuit 261 divides the two way channel used in the local office into outgoing and incoming (or send and receive) channels, for east and west voice paths T1, R1, and T2, R2, respectively.

The E3B repeater 262 is a single frequency (2600Hz) device which applies or detects an idle tone on trunk 1. In greater detail, an E3B repeater is a d.c.-to-SF tone signaling converter which is connected to the four wires T1, R1, T2, R2. The E3B repeater 262 is controlled from the local toll switching center 253, in a d.c. manner, via a well known M lead. The repeater controls equipment at the toll switching center 253, also in a d.c. manner via a well known E lead. The d.c. M-lead signals causes the E3B repeater 262 to send out idle tone on trunk 1. The receipt of this idle tone causes the E3B repeater 265 to send out d.c. signals on its associated E-lead. Those skilled in the art are completely familiar with E and M lead signaling.

The tandem office 221 may operate in any well known manner. It is here assumed that the tandem office preassigns any idle trunk to serve the next call. Therefore, when the seizure signal is received over the east branch of trunk 1, the preassigned trunk 2 is automatically connected to form a telecommunication channel extending from office 220 to office 222. When trunk 2 becomes busy, the tandem office automatically steps on to preassign the next idle trunk, which may be trunk 3.

Figure 6:
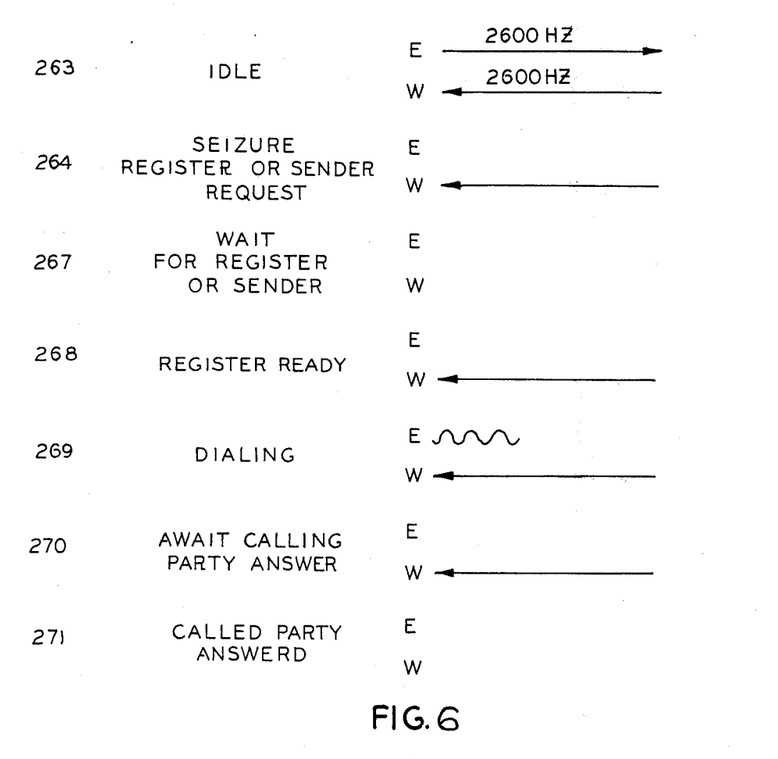
FIG. 6 is a graph which explain how a single frequency signaling system operates in a toll transmission system.

To understand the single frequency (SF) signaling system operation, assume first that the trunk 1 is in the idle condition. A 2600Hz idle tone is transmitted in both east 1, west 1, directions as shown at 263 in FIG. 6. When subscriber A places his call, toll switching center 253 marks the M-lead as a seizure signal. As a result, the E3B repeater 262 removes the 2600Hz idle tone from the send or east channel, as indicated at 264 (FIG. 6). A distant SF signaling unit (such as the E3B repeater 265 in distant office 222) continues sending idle tone in the west direction. That same repeater sends a d.c. signal over the E-lead, which is recognized as a request for a register or sender at toll switching center 266.

Since there may be a slight delay in securing a register, the E3B repeater 265 in the distant office 222 removes the west 2600Hz idle tone, as indicated at 267 (FIG. 6). This tone removal notifies the originting office 220 to delay transmission of the MF digital address information.

When an incoming register is connected to trunk 2 in the distant office 222, the E3B repeater 265 reapplies the 2600Hz idle tone, as indicated at 268 (FIG. 6). The originating or local office 220 may begin sending the addressing digits, (269). While the called line is being rung, the E3B repeater 265 sends the 2600Hz idle tone (270). The 2600Hz idle tone is removed when the called party answers (271).

Removal of idle tone in the west channel (271) causes repeater 262 to mark the E-lead and trip the toll ticketer 254 in the originating office, and a billing process starts. Note that the toll ticketer 254 is associated with the d.c. signaling portion of the system in the originating office. Charges are accumulated until ground appears on the M-lead, which indicates that the calling party has terminated the call by going on hook. This calling party control over the termination of ticketing is appropriate since the calling party normally pays for the call and, therefore, has the right to terminate charges.

As described thus far, a toll path from station A to station B includes one or more telecommunication channels, here trunks 1, 2. One E3B repeater 262 is connected to the originating end and another E3B repeater 265 is connected to the terminating end of the telecommunication channel. These repeaters convert between d.c. signals used in associated toll switching centers and SF signals used on the telecommunication channel.

The toll fraud eliminator 285 is connected to the toll path via connecting means 287, on the d.c. side of the originating d.c. to SF converter or E3B repeater 262. Therefore, any SF tone signals at this point must be fraudulent. As will become more apparent, the toll fraud eliminator (FIG. 2) monitors all voice frequency signals appearing on the transmission line at the location of the outgoing trunk 252. If any signals frequency appears at this point, alone on the transmission line, it is fraudulent.

Next, consider the fraud which happens if the calling subscriber fraudulently generates a 2600Hz idle tone, as by whistling or otherwise sounding a 2600Hz tone into the transmitter of the telephone set at station A.

An E3B repeater, commonly used to transmit the 2600Hz idle tone, is a very simple device which has no "mind" of its own. Such an E3B repeater can do only that which it is told to do by the associated switching equipment. Hence, if its associated equipment is marking the M-lead as being idle, the E3B repeater is instructed to send the idle tone. If the associated equipment is busy, the E3B repeater is instructed not to send the idle tone, again because of the marking on the M-lead. Since the associated toll switching center 253 equipment thus operates on a d.c. basis, the E3B repeater applies or removes idle tone completely independent of the existence or nonexistence of the fraudulent 2600Hz idle trunk line or telecommunication channel, but the receiving equipment at the distant end does not know this. It can only detect the presence or absence of the 2600Hz idle tone which it does or does not receive.

Next, consider the role played by the receiving equipment (i.e., the E3B repeater 265) on the distant end of the trunk line or telecommunication channel. If it receives idle tone, it interprets that tone as an idle trunk line condition and releases any connections which have been established at that end. This release is the same as a release which is responsive to the completion or an abandonment of a call. If a completely new call is thereafter placed, local d.c. signaling equipment at the originating end triggers the originating E3B repeater over the M-lead to remove the idle tone from the newly seized trunk. The E3B repeater 265 at the distant end of the telecommunication channel merely detects the appearance and then the removal of the 2600Hz idle tone, drops the old call and initiates a new call.

Therefore, if the calling subscriber in a previously established call fraudulently blows a whistle or otherwise sounds a 2600Hz idle tone without hanging up, the originating d.c. loop T,R remains closed at station A. The originating equipment is not released, and the originating E3B repeater 262 continues in its busy state wherein it is not sending out idle tone. The distant E3B reporter 265 detects the fraudulently applied 2600Hz idle tone and releases the equipment in that local office. Meanwhile, since the local office 220 is not released, the originally dialed number (800-XXX-1234) remains stored in toll ticketing equipment 254. As soon as the calling subscrier stops fraudulently sending the 2600Hz idle tone, any suitable E3B repeater at a distant end reconnects. The calling subscriber may now send switching control signals or addressing digits to complete a new call to a subscriber line identified by a directory number, which is different from the directory number stored in the toll tickets 254.

There are at least two different kinds of frauds which may be perpetrated in this manner. The most obvious kind of fraud is to dial a first number which diverts the charges to someone else. For example, in the described call, an "800" area code reverses the charge so that someone else pays for the call. The second kind of fraud is to destroy the veracity of the record of a call. Thus, for example, a criminal may dial either a fictitious telephone number or the number of a confederate to establish an alibi. Then, the criminal may divert the call to establish an untraceable call to someone else, for an illegal purpose.

In greater detail, looking from station A, down the voice path, the first receiver tuned to detect a 2600Hz tone transmitted in an east direction will respond to the reappearance of idle tone. Here, it is assumed that when trunk line 2 was seized during the legitimate part of the call, the tandem office preassigned trunk 3 to serve the next call. Hence, the first down stream detector (here assumed to be E3B repeater 280) responds exactly as it would respond if a new call had been placed. Since the trunk assignment in the tandem office 221 is on a probability basis, it is likely that any other trunk might also have been selected. The separate distant office 223 is shown here solely to facilitate an explanation; the diverted call might also be redirected to office 222. In any event, the fraudulently calling subscriber really does not care where or how the call is routed since he is not paying the bill.

Since the originating office MF generator 255 has already sent out the addressing digits during the first or nonfraudulent part of the call, it does not have any new function to perform at this time. Therefore, nothing automatically happens at the originating office 220 when the fraudulently sent idle tone disappears. Thus, the subscriber at station A thereafter uses his "blue box" to send a new set of MF addressing digits, which pass undetected through local office 220. Here it is assumed that MF receiver 282 is the first down stream MF receiver which will respond to these "blue box" tones. When this first MF receiver 282 responds, the toll switching center 283 completes the fraudulent call.

It is difficult to know precisely when the toll ticketer 254 might begin to bill the call. That start of billing will begin whenever the ticketer sees the proper combination of signals, as disclosed in FIG. 6, which appears to indicate that a called party has answered. However, the subscriber at station A does not care when this occurs because the subscriber at station B is paying for the call. Or, if ticketing begins too early on a diversion to conceal a criminal call, any extra charge is a small price to pay if the subscriber at station A conceals the true identification from public records.

According to the invention, such a fraudulent call diversion cannot be carried out because fraud eliminators 285, 286 are connected into the voice path to detect fraudulently sent 2600Hz idle tone. These fraud detectors may be any suitable devices for detecting the presence of an apparently valid 2600Hz idle tone at a fraudulent location. It does not matter where these fraud eliminators are inserted, as long as they are up stream in the voice transmission path, with respect to any legitimately applied 2600Hz idle tone signals.

As FIG. 1 is drawn, the fraud detectors are associated with an outgoing trunk circuit 252 of the central office 251. In the toll fraud eliminator embodiment 285, a fraudulently sent idle tone (2600Hz, for a proper time duration) appears on wires 287, which causes relay 289 to operate and open sleeve lead contacts 290. This removes the master ground holding the local switch train (e.g., in central office 251), which releases. In the toll fraud eliminator embodiment 286, the tone appears on wires 291 to operate relay 292, and close contacts 293 to shortcircuit tip and ring conductors T,R. Thereafter, no voice currents can be transmitted beyond the central office 251. The embodiment 285 is preferred if a sleeve is present at the location where the fraud eliminator is connected into the voice path.

The nature of the toll fraud eliminator invention will become more apparent from a study of FIGS. 2–5.

Figure 2:
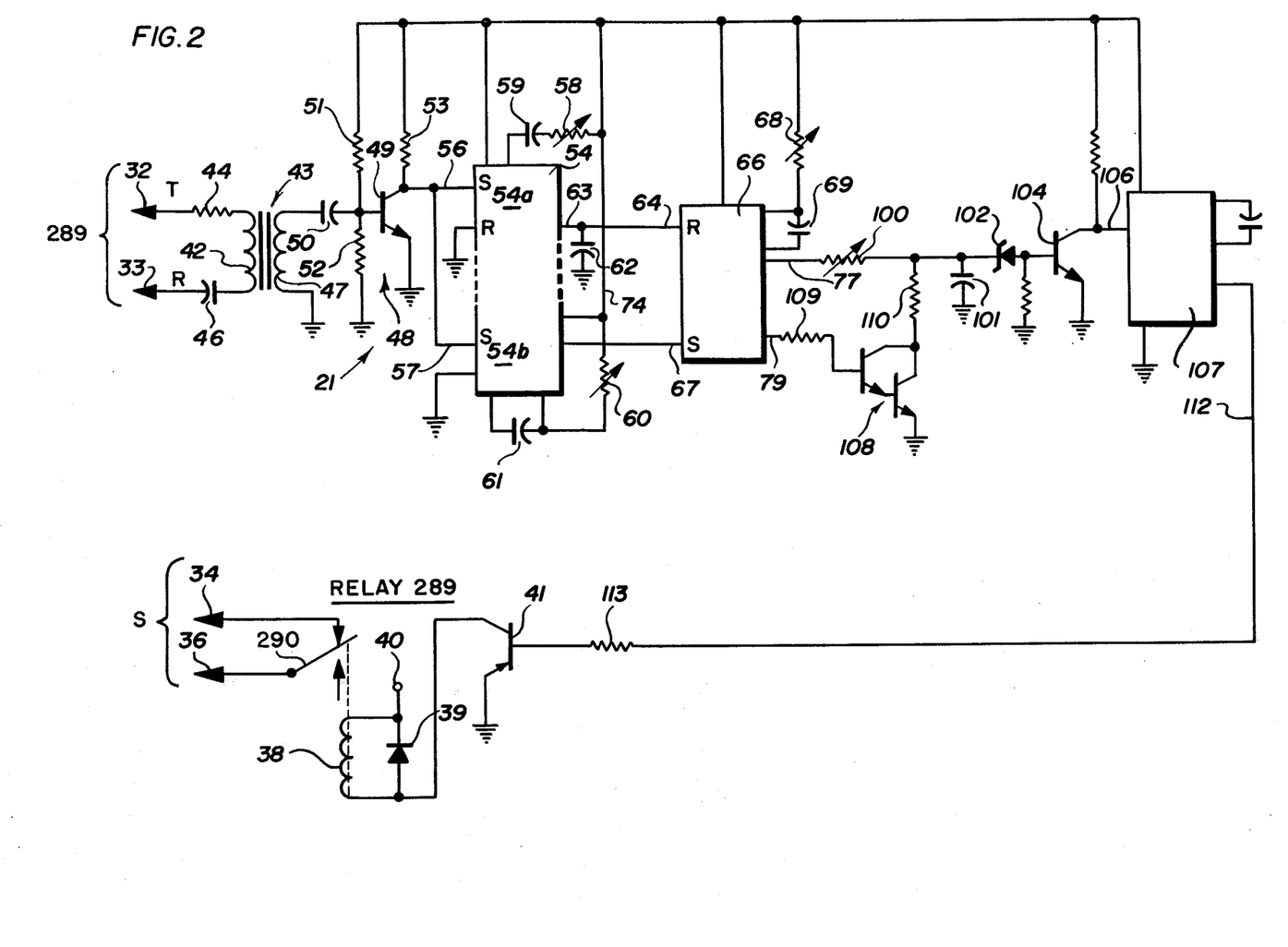
FIG. 2 is a detailed schematic diagram of the toll fraud eliminator of this invention.

In greater detail, conductors 32, 33 form the conductors pair 287 leading from the tip and ring conductors of trunk lines 252 to the fraudulent tone detector circuit of FIG. 2. The sleeve S is connected to terminals 34 and 36. Continuity between terminals 34 and 36 is provided by contacts 290 of relay 289. When these contacts open, any completed connection is interrupted. The relay 289 includes a relay winding 38 shunted by a diode 39 for preventing the generation of a reverse EMF. Energization of the relay winding 38 is provided by a driver transistor 41. The driver transistor 41 is switched on only when the circuitry of the fraudulent tone detector of FIG. 2 senses a signal of proper frequency and time duration on the line.

The audio signals appearing on tip and ring are applied through isolation resistor 44 and capacitor 46 to the primary winding impedance is in the order of about 1 K ohms, while the secondary winding 47 is in the order of about 10 K ohms. The isolation transformer 43 provides for matching the impedance of the tip and ring conductors to the input impedance of a transistor amplifier circuit 48. Resistor 44 further increases the effective impedance of the transformer 43, thereby reducing the load on the talking pair of lines 32 and 33. Capacitor 46 provides audio coupling with DC isolation.

The secondary winding 47 is connected to the base of transistor 49 via an isolation capacitor 50. The base electrode of transistor 48 is biased to +0.65 volts by means of a voltage divider network comprising resistors 51 and 52. The bias on transistor 49 enables a signal greater than 0.05 volts to turn on the transistor. Because of the high impedance collector load presented by a resistor 53, and because the inputs of an integrated circuit arrangement 54 are greater than the 10 K ohms, the transistor 49 saturates when signals greater than 0.05 volts are applied to the base. This will produce square wave pulses at the output of the transistor.

Means are provided for detecting signal frequencies which are between upper and lower thresholds. More particularly, the output of transistor 49 is delivered in parallel over lines 56 and 57 as negative going trigger input pulses to the set terminals S of two retriggerable one-shot multi-vibrators 54a and 54b, of the integrated circuit 54. A variable resistance element 58 in series with a capacitor 59 provides an RC time constant of approximately 392 microseconds which corresponds to 2550 Hz; therefore, the period of one-shot multivibrator circuit 54a has a 392 microsecond time interval which corresponds to the lowest acceptable threshold of the single signal frequency of 2600Hz. A variable resistance element 60 and series capacitor 61 are selected to provide an RC time constant of 378 microseconds for the one-shot multi-vibrator 54b, which corresponds to 2650Hz. Therefore, the period of one shot multi-vibrator 54b corresponds to a frequency at the upper threshold of the single signal frequency of 2600Hz.

Figure 3:
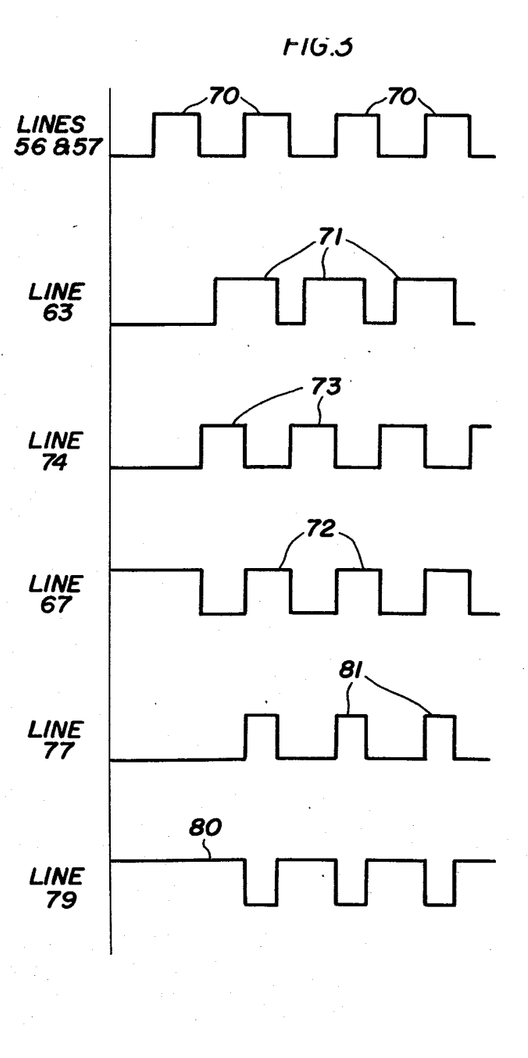
FIG. 3 illustrates a series of waveforms obtained during one instance when the toll fraud eliminator of this invention senses signals of a frequency less than 2550 Hz.

Briefly, the operation of the fraudulent tone detector means depends upon an appearance, in the communication channel, of a tone signal having a frequency between a lower threshold of 2550Hz and an upper threshold of 2650Hz. Each half cycle of a given polarity in the single frequency signal tone may be viewed as a pulse for retriggering the one shot multi-vibrators 54a, 54b. If the tone frequency is below the lower threshold frequency, one shot multi-vibrator 54a may time out and thereafter be retriggered by the next succeeding half cycle of the given polarity, as shown in line 63 (FIG. 3). Obviously the faster multi-vibrator 54b will also time out as shown in line 67 of FIG. 3.

On the other hand, if the frequency of the tone is greater than the upper threshold frequency, neither of the one shot multi-vibrators 54a and 54b will time out before it is retriggered by the securing half cycles of the given polarity. Therefore, both multi-vibrtors will hold a stable and steady state voltage, at its respective output, as shown in lines 63 and 67 in FIG. 5.

However, if the tone signal has a frequency which is above the lower threshold and below the upper threshold (i.e., between 2550Hz and 2650Hz), the slower multi-vibrator will be retriggered before it can time out. Therefore, a stable and steady state voltage appears as shown in line 63 of FIG. 4, while the faster of the one shot multi-vibrator can time out. This combination triggers a 0.13 second timer, 101, 110 which, after a delay, operates relay 289 to interrupt and release the call then in progress.

A capacitor 62 is connected to the $\overline{Q}$ output terminal 63 of the one shot multi-vibrator 54a, and provides a time delay of 2 microseconds. This delayed pulse output terminal 63 is connected directly to the reset or enable input terminal 64 of an integrated circuit 66. The $\overline{Q}$ output of the integrated circuit 54 is connected via wire 67 to the positive trigger input or set terminal S of the integrated circuit 66. A variable resistance element 68 and a capacitor 69 are associated with the integrated circuit 66 to provide a one shot time constant in the order of about 393 microseconds, which corresponds to a frequency of 2540 Hz (or 10 Hz lower than the threshold of minimum acceptable frequency of interest).

For a better understanding of the filter response for frequencies significantly below the minimum threshold frequency of 2550Hz, reference is now made to FIG. 3 which shows the series of waveforms associated with the toll fraud eliminator circuit of FIG. 2. A series of pulses 70 represent the input signals appearing on input lines 56 and 57 of the one shot multi-vibrator circuits 54a and 54b. The output of the multivibrator circuit 54a is represented by pulses 71, each of which has a time duration of 392 microseconds (i.e., the minimum acceptable signal frequency). This duration is adequate to hold the reset terminal 64 of the one shot multivibrator circuit 66 enabled for that period of time. One shot multivibrator circuit 54b provides a signal at the input terminal 67 of the integrated circuit 66, for a period of 378 microseconds, as represented by the square waveforms 72. The square waveform 73 represents the output of the integrated circuit 54b, which is delivered along the line 74. By reference to FIG. 3, one of the output terminals 77 of integrated circuit 66 goes to the low voltage state when the output terminal 63 of integrated circuit 54a also goes to a low voltage. This causes the integrated circuit 66 to hold the output terminal 67 at a high voltage for a small percentage of the time, while the signal on the telecommunication channel is significantly lower than the 2600Hz single frequency and until the input frequency approaches 2550Hz. Conversely, integrated circuit 66 has an output terminal 79 which stays at a high voltage most of the time, as represented by the waveform 80 of FIG. 3. The pulse output waveform of terminal 77 is represented by the waveform 81 of FIG. 3.

Figure 5:
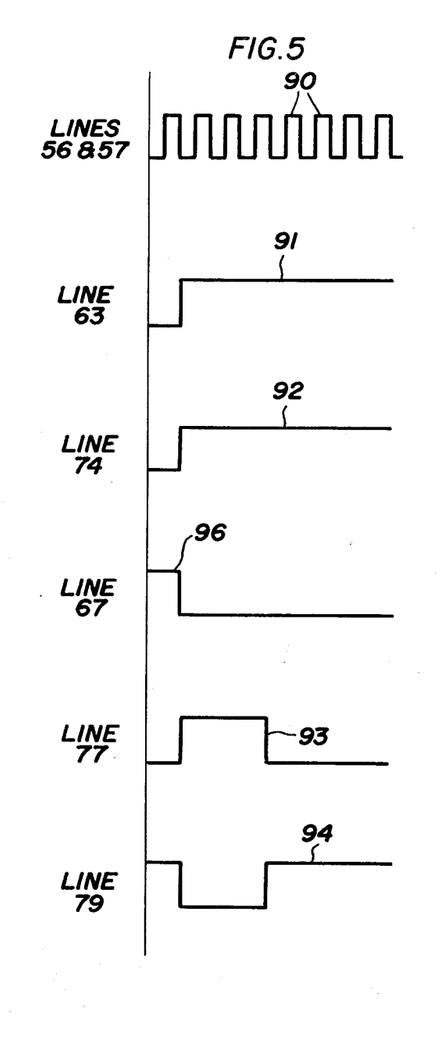
FIG. 5 is another series of waveforms obtained during still another instance when the toll fraud eliminator of this invention senses signals greater than 2650 Hz.

FIG. 5 shows a series of waveforms which represent the response of the toll fraud eliminator circuit when the sensed frequencies are significantly higher than the inband frequencies. At frequencies above 2650Hz, input signals 90 cause no output signals at lines 63 and 67, as represented by the waveforms 91 and 92. This steady state voltage occurs because the one shot multivibrator circuits 54a, 54b are repeatedly retriggered before they time out. This causes the integrated circuit 66 to retrigger once every 393 microseconds, as represented by waveform 93, which is the output of line 77. The voltage on line 79 is represented by the waveform 94, while the waveform 96 represents the $\overline{Q}$ output of integrated circuit portion 54b. With the output terminal 77 in the low voltage state and with output terminal 79 in the high voltage state, as represented by waveforms 93 and 94, respectively, a 0.13 second timer 101, 110 is not triggered, and the reset circuit is actuated.

Figure 4:
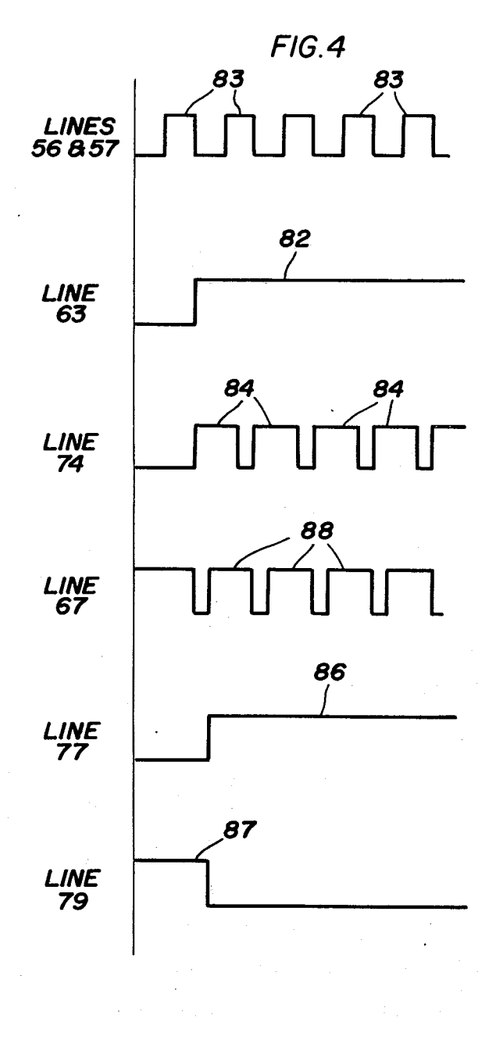
FIG. 4 is a series of waveforms obtained during another instance when the toll fraud eliminator of this invention senses signals of a frequency between 2550 and 2650 Hz.

The waveforms of FIG. 4 show signals which appear when the input frequencies are with the band of 2550 Hz to 2650 Hz. These frequencies are referred to herein as the "inband frequencies".

Integrated circuit 54a has an output 63 which goes to a high voltage and stays high, as represented by waveform 82, responsive to a sensing of the first input signal 83, as it is received from transistor 49. Integrated circuit 54b has an output line which is energized by a time pulse of 378 microseconds, waveform 84, after each negative going input pulse of the waveform 83.

When the integrated circuit 66 times out for a period of 393 microseconds the output terminal 77 goes to a high voltage and stays there, as indicated by the waveform 86. The output terminal 79 of integrated circuit 66 goes to a low voltage and stays low, as indicated by waveform 87. Waveform 88 represents the output of the one shot multi-vibrator 54b, as delivered to line 67. The waveform 86, at line 77, therefore provides the signal for triggering a 0.13 second timer comprising the RC network 101, 110. This time period is to be utilized in disabling the telephone lines when a fraud is attempted on the toll system.

The timer and reset circuit is connected to output terminals 77 and 79 and operates only when an inband signal is obtained, as illustrated in FIG. 4. When the inband signal is present, terminal 77 of integrated circuit 66 goes to a high voltage, as represented by waveform 86 of FIG. 4. This applies a voltage of predetermined potential to variable resistor element 100, to charge a capacitor 101 to the value fixed by a Zener diode 102, which is in the order of about 0.7 volts. At this voltage a transistor 104 becomes conductive, to apply a ground potential to an input terminal 106 of an integrated circuit 107. The values of capacitor 101 and resistor 100 are selected to provide a time delay of 0.13 seconds, before transistor 104 becomes conductive. If the inband signal is lost during this 0.13 second time delay period, the terminal 77 of integrated circuit 66 goes to a low voltage, and terminal 79 thereof goes to a high voltage. The Darlington transistor configuration 108 immediately becomes conductive responsive to a bias voltage applied through resistor 109, to discharge capacitor 101 through resistor 110. The time required to discharge capacitor 101 through resistor 110 is approximately 1% of the charge time. Therefore, 2600Hz signal frequencies of short duration, which randomly appear during normal speech signals, will not trigger the integrated circuit 107.

If an inband signal is present for more than 0.13 seconds, transistor 104 becomes conductive, and its collector immediately goes to ground potential. This ground or negative pulse triggers integrated circuit 107, which is a one shot multi-vibrator having a time duration of 0.005 seconds. When multi-vibrator 107 is triggered, the output line 112 goes to a high voltage, thereby providing bias voltage to the base of transistor 41, via a series resistor 113. When transistor 41 is switched on, relay 289 operates and opens the normally closed contacts 290 for a time period of 0.5 seconds. If the sleeve S is connected through these normally closed contacts, the associated switch train releases and returns to normal, thereby disconnecting the calling party.

This release may also be accomplished by a toll fraud eliminator connected to a line leading to a receiving party. Therefore, the telephone call is interrupted if a control tone appears at a point in a telecommunication channel where such tones cannot legitimately appear.

In one exemplary circuit, the integrated circuits 54a, 54b, 66 and 107 are Motorola Corporation part number MC 14528CL, and transistors 49, 104, 108 are type 2N2222.

What has been described is a simple and efficient toll fraud eliminator circuit which may be connected directly into existing telephone lines. When fraudulent 2600 Hz single frequency signals are received, the calling or called parties are disconnected, short circuited or otherwise barred from using the line.

Variations and modifications of this invention may be made without departing from the spirit and scope of the invention. Therefore the following claims are to be construed to include all equivalent structures.

I claim:

1. A system including a single frequency toll fraud eliminator, said system comprising a telephone exchange having a plurality of lines connected to one side and trunks connected to the other side, at least one of said trunks comprising a d.c. to single frequency converter means connected to originate and terminate ends of said one trunk; said toll fraud eliminator comprising single frequency tone detecting means connected to said one trunk on the d.c. side of said d.c. to single frequency converter means at the end of said one trunk where said call originated, whereby said tone detector is connected into said trunk at a point where an apparently valid control tone signal of said single frequency cannot legitimately appear, said single frequency tone detecting means operating responsive to signals having said single frequency and call barring means operated responsive to said single frequency tone detecting means for interrupting any call connection from said exchange which is then using said telecommunication channel.

2. The fraud eliminator of claim 1 wherein said give frequency is a 2600 Hz tone.

3. A fraud eliminator comprising means for connecting said eliminator into a telecommunication channel at a point where an apparently valid control tone signal of a given frequency cannot legitimately appear, fraudulent tone detector means in said eliminator operated responsive to signals having said given frequency of an apparently valid control tone signal, call barring means operated responsive to said fraudulent tone detector means detecting said apparently valid control tone for interrupting any call connection then using said telecommunication channel, a pair of timing means for respectively measuring two distinctive time periods corresponding to upper and lower frequency thresholds on either side of said given frequency, means responsive to an appearance of a tone on said line for continuously retriggering said timing means at the frequency of said tone, and means responsive to a continued retriggering of the timing means for measuring said lower threshold and to a non-retriggering of timing means for measuring said upper threshold for signaling the presence of the tone.

4. The fraud eliminator of claim 3 wherein each of said pair of timing means is a one shot multi-vibrator.

5. The fraud eliminator of claim 3 and means for measuring a predetermined period of apparently valid tone before signaling the presence of the tone, said predetermined period being approximately 0.13 seconds.

6. A toll fraud eliminator for connection to a path extending from a telephone line through a central telephone office switch train to a trunk line, comprising means for connecting said fraud eliminator between said switch train and said trunk line while said path is part of a connection between two subscribers, toll ticketing means for registering toll charges relating to calls made between subscribers, signal generating means connected between said fraud eliminator and said trunk line for producing a signal tone of predetermined frequency on said trunk line, and switch means connected between said signal generating means and said switch train and operated responsive to an appearance of said signal tone at a point between said signal generating means and said switch train for automatically disconnecting said subscribers to prevent toll fraud.

7. The toll fraud eliminator of claim 6 wherein said toll ticketing means is operated responsive to an appearance of a tone generated by said signal generating means and the operation is canceled responsive to said switch means.

8. A toll fraud eliminator for connection into a telephone line, comprising means for connecting said fraud eliminator to said line while it is part of a connection between two subscribers, said line including toll ticketing means for registering toll charges relating to calls made between subscribers, signal generating means connected downstream from one of said subscribers for producing a signal tone of predetermined frequency, said toll ticketing means being operated responsive to an appearance of a tone generated by said signal generating means, switch means connected to said telephone line upstream from said signal generating means and operated responsive to an appearance of said signal tone at said upstream connection for automatically disconnecting said subscribers to prevent toll fraud, the operation of said toll ticketing means being canceled responsive to said switch means, a pair of timing means for respectively measuring two distinctive time periods corresponding to upper and lower frequency thresholds on either side of said signal tone frequency, said switch means comprising circuit means responsive to an appearance of a tone on said line for continuously retriggering said timing means at the frequency of said tone, and means responsive to a continuous retriggering of the timing means measuring said lower threshold and to a non-retriggering of the timing means measuring said upper threshold for signaling the presence of the tone.

9. The toll fraud eliminator of claim 8 wherein each of said pair of timing means is a one shot multi-vibrator.

10. A toll fraud eliminator for connection into a telephone line, comprising means for connecting said fraud eliminator to said line while it is part of a connection between two subscribers, said line including toll ticketing means for registering toll charges relating to calls made between subscribers, signal generating means connected downstream from one of said subscribers for producing a signal tone of predetermined frequency, switch means connected to said telephone line upstream from said signal generting means and operated responsive to an appearance of said signal tone at said upstream connection for automatically disconnecting said subscribers to prevent toll fraud, said toll ticketing means being operated responsive to an appearance of a tone generated by said signal generating means, said operation being canceled responsive to disconnect by said switch means, and circuit means responsive to the output of said switch means for measuring the duration of said signal tone for at least a predetermined time period prior to said disconnection of said subscribers when signals of said predetermined signal tone frequency are applied to the telephone line location, whereby the cancellation of the operation of said toll ticketing means and the automatic disconnection of said subscribers occurs only after said predetermined time period.

11. A toll fraud eliminator for use on a toll path including at least one telecommunication channel, comprising a d.c. to single frequency converter means connected to originate and terminate ends of said telecommunication channel; said toll fraud eliminator comprising means for connecting said eliminator to said toll path on the d.c. side of said d.c. to single frequency converter means at the originating end of said telecommunication channel, means responsive to signals appearing on said connecting means for precluding a continuation of a call or an attempted call in progress when said signals so appear, said call continuation precluding means comprising means for detecting upper and lower threshold frequencies on opposite sides of said single frequency connected in a series circuit including a relay, said threshold detecting means passing substantially only said single frequency, means responsive to the output of said threshold detecting means for operating said relay, and contacts on said relay for causing said preclusion of the continuation of said telephone call.

12. The toll fraud eliminator of claim 11 and means associated with said threshold detecting means comprising a duration timing means for precluding operation of said relay until after the elapse of an initial period following an output from said threshold detection means.

13. The toll fraud eliminator of claim 12 wherein said threshold detecting means comprises a pair of timing means for respectively measuring two distinctive time periods corresponding to said upper and lower threshold frequencies, means responsive to an appearance of said single frequency on said d.c. side of said single frequency converter means at said originating end for continuously retriggering said timing means at the single frequency, and means responsive to a continuous retriggering of the timing means measuring said lower threshold and to a non-retriggering of timing means measuring said upper threshold for signaling the presence of the single frequency.

* * * * *